(12) United States Patent
Eichenberg et al.

(10) Patent No.: US 9,874,444 B2
(45) Date of Patent: Jan. 23, 2018

(54) SYSTEMS AND METHODS OF USING DIGITAL PHOTOGRAPH OF A STRUCTURE TO QUANTIFY ITS DIMENSIONS, WEIGHT, VOLUME, AND THE AMOUNT OF MATERIAL ASSOCIATED THEREWITH

(71) Applicant: Salestimate, LLC, Mission, KS (US)

(72) Inventors: Michael Lee Eichenberg, Olathe, KS (US); Kevin O'Rourke, Parkville, MO (US)

(73) Assignee: Salestimate, LLC, Mission, KS (US)

(*) Notice: Subject to any disclaimer, the term of this patent is extended or adjusted under 35 U.S.C. 154(b) by 1011 days.

(21) Appl. No.: 13/927,055

(22) Filed: Jun. 25, 2013

(65) Prior Publication Data
US 2013/0342682 A1    Dec. 26, 2013

Related U.S. Application Data

(60) Provisional application No. 61/663,945, filed on Jun. 25, 2012.

(51) Int. Cl.
*G01C 11/04* (2006.01)
*G01C 5/00* (2006.01)

(52) U.S. Cl.
CPC .............. *G01C 11/04* (2013.01); *G01C 5/00* (2013.01)

(58) Field of Classification Search
CPC ...................................................... G01C 11/04
USPC ......................................................... 348/137
See application file for complete search history.

(56) References Cited

U.S. PATENT DOCUMENTS

| | | |
|---|---|---|
| 5,105,392 A | 4/1992 | Stringer et al. |
| 5,331,118 A | 7/1994 | Jensen |
| 5,501,571 A | 3/1996 | Van Durrett et al. |
| 5,528,517 A | 6/1996 | Loken |
| 5,734,476 A | 3/1998 | Dlugos |
| 5,770,864 A | 6/1998 | Dlugos |
| 5,777,746 A | 7/1998 | Dlugos |
| 5,808,912 A | 9/1998 | Dlugos et al. |
| 5,841,541 A | 11/1998 | Dlugos |
| 6,850,464 B2 | 2/2005 | Carlsruh et al. |
| 7,293,368 B1 * | 11/2007 | Faulk ............... G01C 11/00 33/194 |
| 7,679,725 B2 | 3/2010 | Greenberg et al. |
| 8,228,510 B2 | 7/2012 | Pangrazio et al. |
| 2013/0033596 A1 * | 2/2013 | Crothers ............ G01B 21/045 348/135 |
| 2014/0046627 A1 * | 2/2014 | Pershing ............ G01B 21/28 702/156 |

* cited by examiner

*Primary Examiner* — Yulin Sun
(74) *Attorney, Agent, or Firm* — Lathrop Gage L.L.P.

(57) ABSTRACT

A method in a computer system for estimating an area of an object comprises the step of placing a scaling object adjacent a first side of the object. A first digital image of the object first side and the scaling device is taken. The scaling device is then placed adjacent the second side of the object, and a second digital image of the object second side and the scaling device is taken. The first image is converted into a first pixel grid and the second image is converted into a second pixel grid. An input device is used to mark respectively on the first and second pixels grids the endpoints of the scaling device along with endpoints of the first and second sides. Numerical values for a height and a width of the scaling device are entered using the input device.

8 Claims, 16 Drawing Sheets

You have selected ENTRANCE DOORS (409)
You can also select in doors GARAGE DOORS (403)   SCREEN DOORS (405)   SLIDING DOORS (407) and OTHER (411)

| Image | Manufacturer | Height | Width | Depth | Weight | Constituent Material(s) |
|---|---|---|---|---|---|---|
| 409A | Reliabilt | 79" | 36" | 7" | 15 lbs | Pine, Teak |
| 409B | ProSteel | 80" | 36" | 7" | 25 lbs | Steel |
| 409C | ProSteel | 80" | 35" | 7" | 28 lbs | Metal alloy |
| 409D | Reliabilt | 92" | 45" | 5" | 30 lbs | Oak |

FIG. 13

| Col. No → / Row No. ↓ | A | B | C | D |
|---|---|---|---|---|
| | Distance 406 between camera 404 and pallet front side 400F (in.) | Height 408H of scaling device 408 (in.) | Height 400H of pallet front side 400F initially calculated by system 100" (in.) | Vertical adjustment 410 (in.) |
| 1 | 72 | 72 | 72 | 0 |
| 2 | 72 | 72 | 62 | 0.2 |
| 3 | 72 | 72 | 50 | 0.4 |
| 4 | 96 | 72 | 72 | 0 |
| 5 | 96 | 72 | 62 | 0.3 |
| 6 | 96 | 72 | 50 | 0.4 |
| 7 | 120 | 42 | 42 | 0 |
| 8 | 120 | 42 | 62 | 0.5 |
| 9 | 120 | 42 | 72 | 0.7 |
| 10 | 120 | 72 | 72 | 0 |
| 11 | 120 | 72 | 62 | 0.3 |
| 12 | 120 | 72 | 50 | 0.6 |
| 13 | 240 | 72 | 72 | 0 |
| 14 | 240 | 72 | 62 | 0.7 |
| 15 | 240 | 72 | 50 | 0.9 |

SYSTEMS AND METHODS OF USING DIGITAL PHOTOGRAPH OF A STRUCTURE TO QUANTIFY ITS DIMENSIONS, WEIGHT, VOLUME, AND THE AMOUNT OF MATERIAL ASSOCIATED THEREWITH

CROSS-REFERENCE TO RELATED APPLICATIONS

This application claims priority to U.S. Provisional Patent Application Ser. No. 61/663,945 filed Jun. 25, 2012, the disclosure of which is incorporated herein by reference in its entirety.

BACKGROUND OF THE INVENTION

Measuring tapes are well known in the art. For example, while constructing a building, a builder may use a measuring tape to measure the height or width of the building to, for example, determine the dimensions of the doors or windows that would need to be installed. Or, for example, during renovation, a painter may use a measuring tape to measure the height and width of a wall to determine the required volume of paint.

Measuring tapes, while useful, have their shortcomings. For example, in addition to a measuring tape, one may require a ladder to be able to measure the height of a tall wall. Additionally, measuring tapes may yield inconsistent results, particularly where the length of the tape is less than the length of the dimension being measured.

SUMMARY

Systems and methods for approximating dimensions of objects using digital images of objects are disclosed herein. According to one embodiment, a system for approximating a height and a width of an object using a digital image of the object comprises a processor in data communication with a storage unit. A camera configured for capturing digital images of the object and uploading the same onto a storage unit is included. An output device is configured to display a grid of pixels created from the digital image. An input device allows a user to mark an endpoint of the object on the grid of pixels. The system further comprises a distortion adjustment database having a plurality of vertical adjustment factors and an architectural database comprising dimensions of a plurality of structures.

According to another embodiment, a method in a computer system for estimating an area of an object comprises the step of placing a scaling object adjacent a first side of the object. A first digital image of the object first side and the scaling device is taken. The scaling device is then placed adjacent the second side of the object, and a second digital image of the object second side and the scaling device is taken. The first image is converted into a first pixel grid and the second image is converted into a second pixel grid. An input device is used to mark on the first pixel grid at least two endpoints of the scaling device and at least two endpoints of the object first side. The input device is also used to mark on the second pixel grid at least two endpoints of the scaling device and at least two endpoints of the object second side. Numerical values for a height and a width of the scaling device are entered via the input device.

According to yet another embodiment, a portable system for approximating a height and a width of an object using a digital image of the object comprises a processor in data communication with a storage unit. A camera for capturing a digital image of the object is provided. The camera is configured to upload the image onto the storage unit. An output device is configured to display a grid of pixels created from the digital image. An input device is configured to allow the user to mark an endpoint of the object on the grid of pixels. A distortion adjustment database comprising a plurality of vertical adjustment factors is also included.

BRIEF DESCRIPTION OF THE SEVERAL VIEWS OF THE DRAWINGS

Illustrative embodiments of the present invention are described in detail below with reference to the attached drawing figures, and wherein:

FIG. 13 shows exemplary contents of an architectural database of the system of FIG. 12;

DETAILED DESCRIPTION

Figure 1:
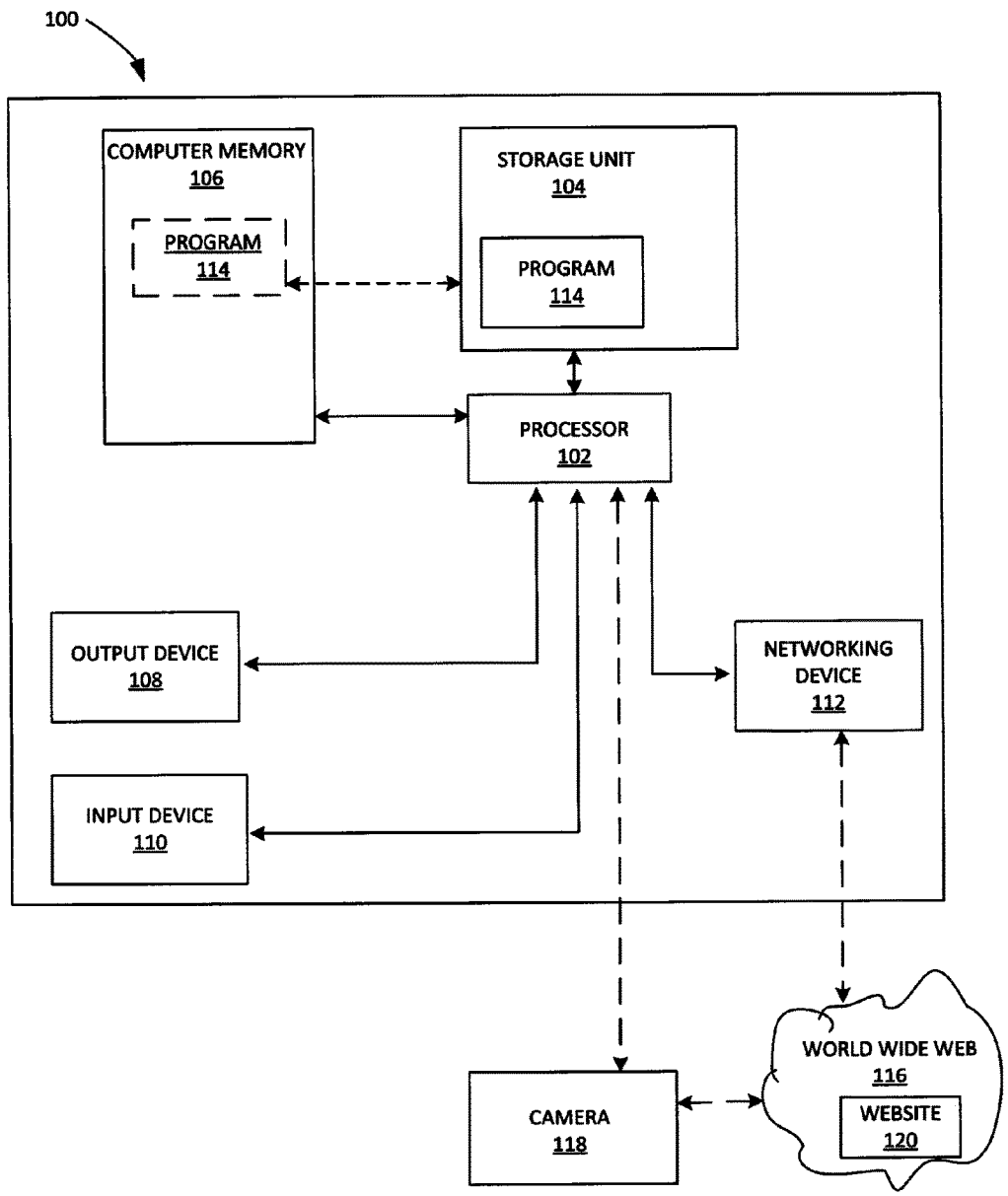
FIG. 1 shows a schematic representation of a system in line with the teachings of the current invention.

Embodiments of the present invention provide systems and methods for quantifying the dimensions of a structure (e.g., a building), the structure's weight and volume, and the amount of material associated with the structure (e.g., siding, paint, et cetera) by utilizing a digital photograph of the structure. FIG. 1 shows one embodiment of a measurement system 100 in line with the teachings of the current invention. The measurement system 100 may comprise a processor 102, which may be in data communication with a storage unit 104, a computer memory 106, an output device 108, an input device 110, and a networking device 112.

The storage unit 104 may be, for example, a disk drive that stores programs and data, and the storage unit 104 is illustratively shown storing a program 114 embodying the steps and methods set forth below. It should be understood that the program 114 could be broken into subprograms and stored in storage units 104 of separate computers and that data could be transferred between those storage units 104 using methods known in the art. A dashed outline within the computer memory 106 represents the software program 114 loaded into the computer memory 106 and a dashed line between the storage unit 104 and the computer memory 106 illustrates the transfer of the program 114 between the storage unit 104 and the computer memory 106.

The output device 108 may be an LCD or Plasma type display screen, a printer, and/or any other appropriate visual and/or audible output device, whether currently available or later invented. The input device 110 may include a keyboard, a mouse, a stylus pen, switches, knobs, biometric sensors, and any other appropriate input devices, whether currently available or later invented. In some embodiments, the output device 108 and the input device 110 may be a single device (e.g., a touch and/or voice activated screen). Nevertheless, embodiments having an output device 108 with such capability and also a separate input device 110 are also contemplated.

The networking device 112 may include a modem, a router, a switch, and/or any other networking devices that may allow the system 100 to connect to networks, such as to the internet (or a World Wide Web 116) or to private or local networks. The networking device 112 may be wired and/or wireless, and may support cellular networks.

The system 100 may include a digital or other camera 118. The camera 118 may include wireless capability. Digital images of objects taken from the camera may be communicated to the processor 102 via the World Wide Web 116. For example, the system 100 may be in data communication with a website 120 housed on the World Wide Web 116 or another network, and the website 120 may be configured to accept and organize images taken from the camera 118 and allow the same to be accessed by the processor 102. Alternatively, or in addition, the camera 118 may be configured to send captured images directly to the processor 102 for processing (e.g., via the networking device 112). All images captured by the digital camera 118 may be stored in the storage unit 104, and may be seamlessly downloaded to (and uploaded from) the website 120. The website 120 may in some embodiments be a secure website (e.g., include password protection, encryption, et cetera).

Figure 2:
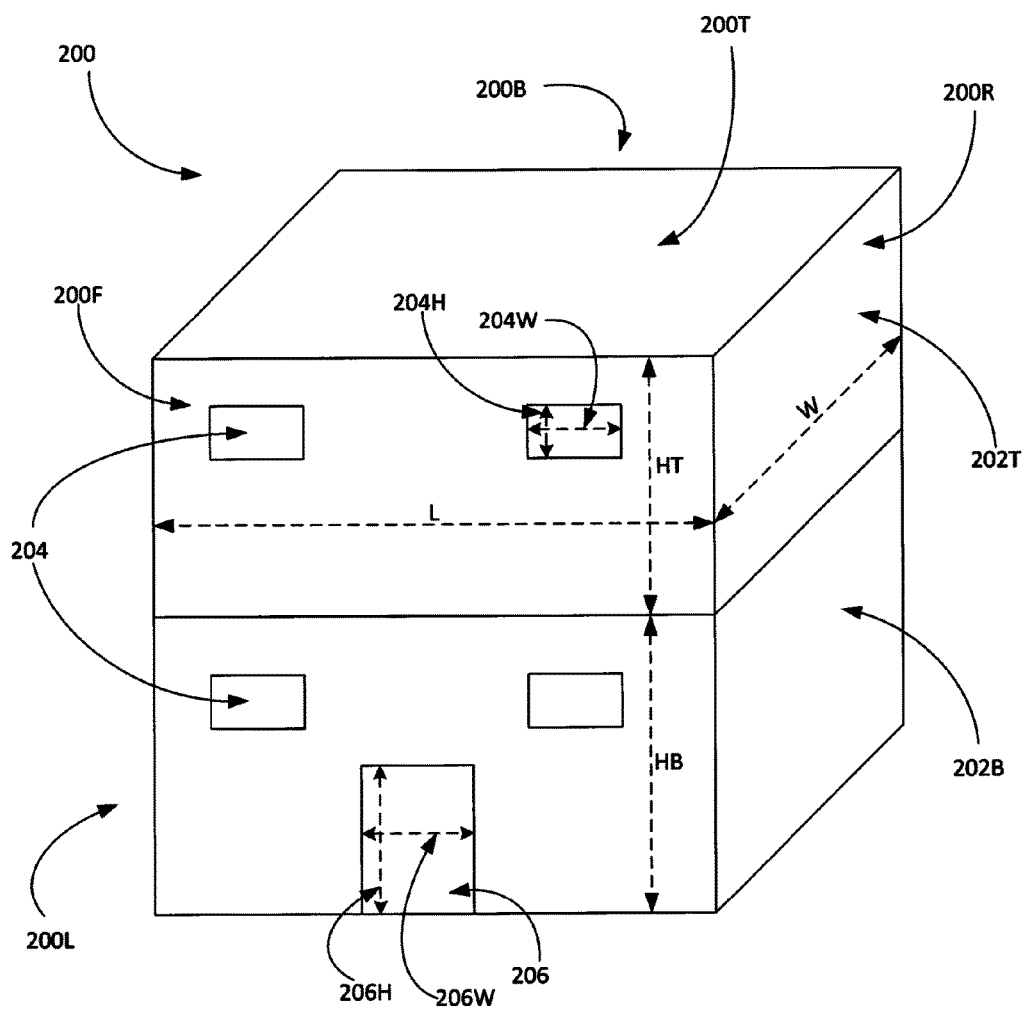
FIG. 2 shows a perspective view of a building being analyzed by the system of FIG. 1.

Attention is now directed to FIG. 2, which shows an exterior of a building 200 including a top floor 202T having a height HT and a bottom floor 202B having a height HB. The building 200 may have a front side 200F having a length L, a right side 200R having a width W, and a top side 200T. While not clearly visible in FIG. 2, the building 200 may also have a left side 200L and a back side 200B, which may be generally identical to the building right side 200R and the building front side 200F, respectively. Both the top floor 202T and the bottom floor 202B may have windows 204 having a height 204H and a width 204W, and the bottom floor 202B may also include a door 206 having a height 206H and a width 206H.

Figure 3:
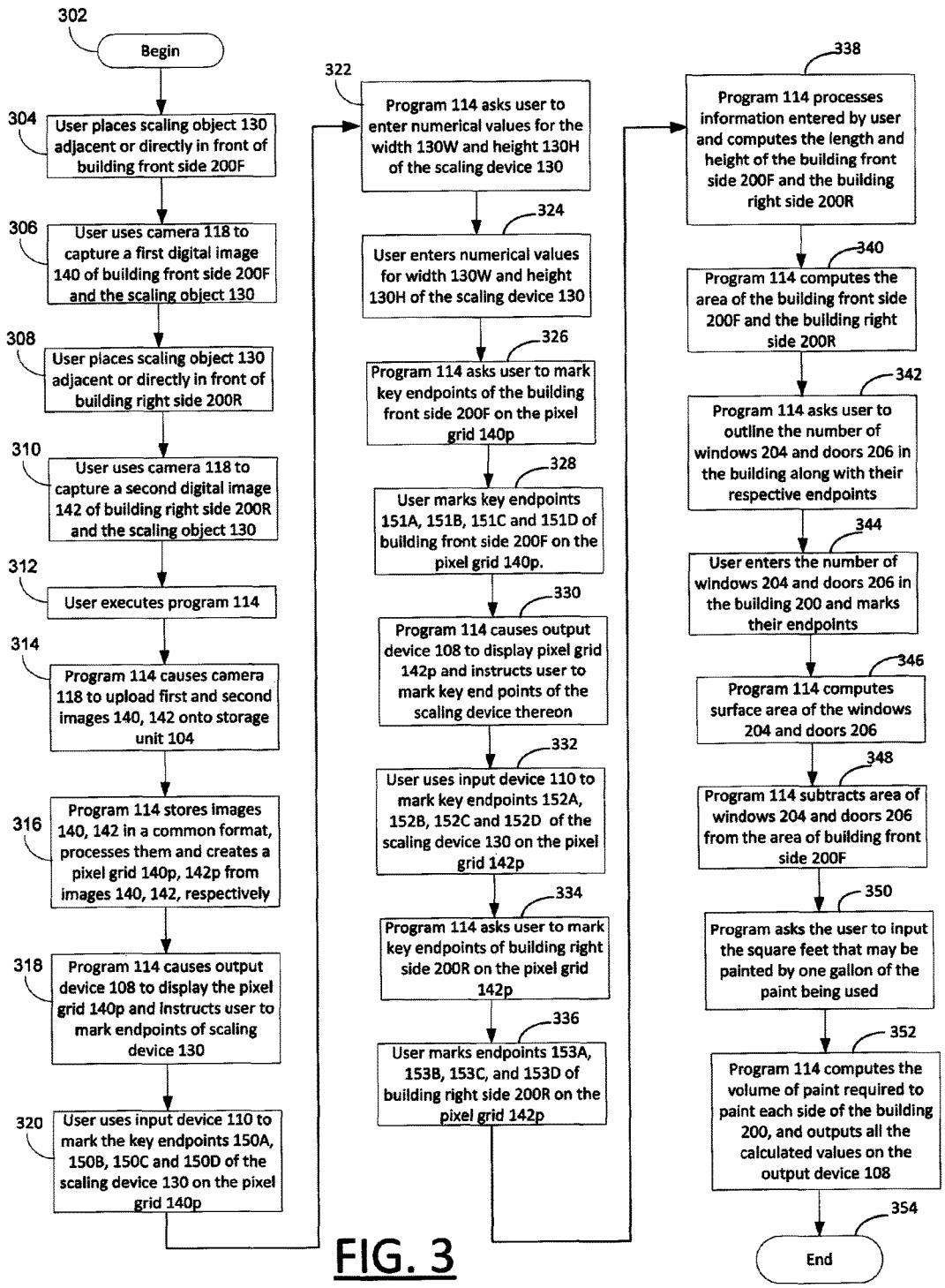
FIG. 3 shows a flowchart outlining steps of a method performed by the system of FIG. 1, according to an embodiment.

It may often be desirable to ascertain the numerical dimensions HT, HB, L, and W of the building 200, and/or the dimensions 204H, 204W, 206H, 206W of the windows 204 and the door 206. For example, when painting or repainting the building 200, its dimensions HT, HB, L and W may allow a painter to determine the area of the building 200, and thereby, the required volume of paint. Or, for example, a construction worker may desire to determine the dimensions 204W, 204H of the windows 204 so as to enable the worker to replace the same. In the prior art, these dimensions would generally be manually ascertained using a measuring tape, which process, as noted above, may be cumbersome and may yield inconsistent results. The system 100, conversely, may allow these dimensions to be quantified by using digital photography. To illustrate, assume, for example, that a user (e.g., a painter) wishes to paint the exterior of the building 200 and desires to determine the volume of paint that he would need to purchase to complete the project. Attention is now directed to FIG. 3, which show a method 300 for determining the dimensions of the building 200 and the volume of paint required to paint the building 200.

Figure 4:
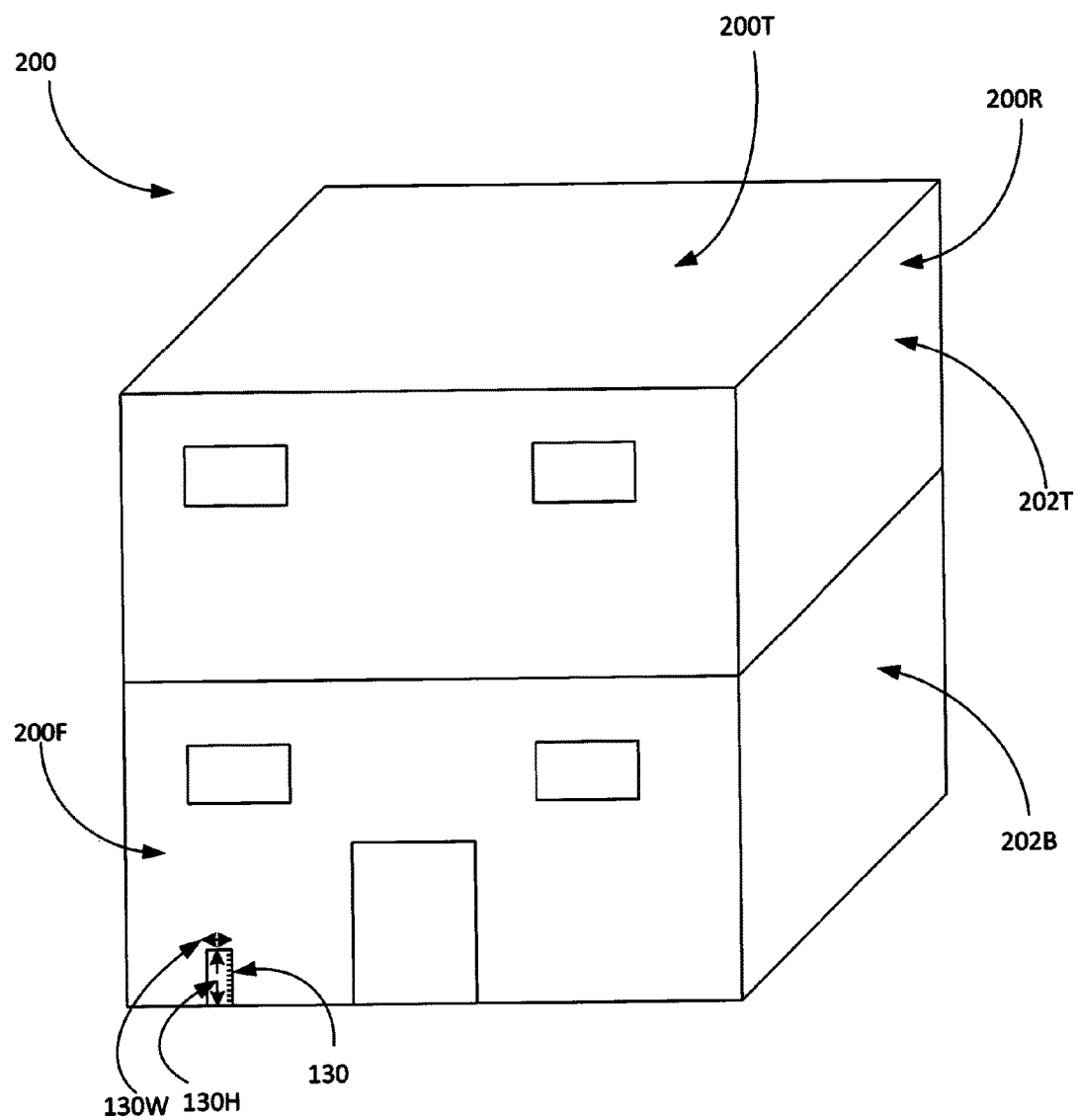
FIG. 4 shows a perspective view of a camera of the system of FIG. 1 being used to capture an image of a front side of the building of FIG. 2.

The method 300 begins at step 302, and at step 304, the user may place a scaling object 130 adjacent or directly in front of the building front side 200F (or the back side 200B), as shown in FIG. 4. The scaling object 130 may be symmetrical (e.g., rectangular, square shaped, et cetera), and may have a length 130H and a width 130W that is known. In FIG. 4, a measuring scale is shown as the scaling object 130. People of skill in the art will appreciate, however, that the scaling object 130 may be any object (e.g., a piece of paper, a wood plank, et cetera) whose dimensions are known or can be easily determined.

Figure 5:
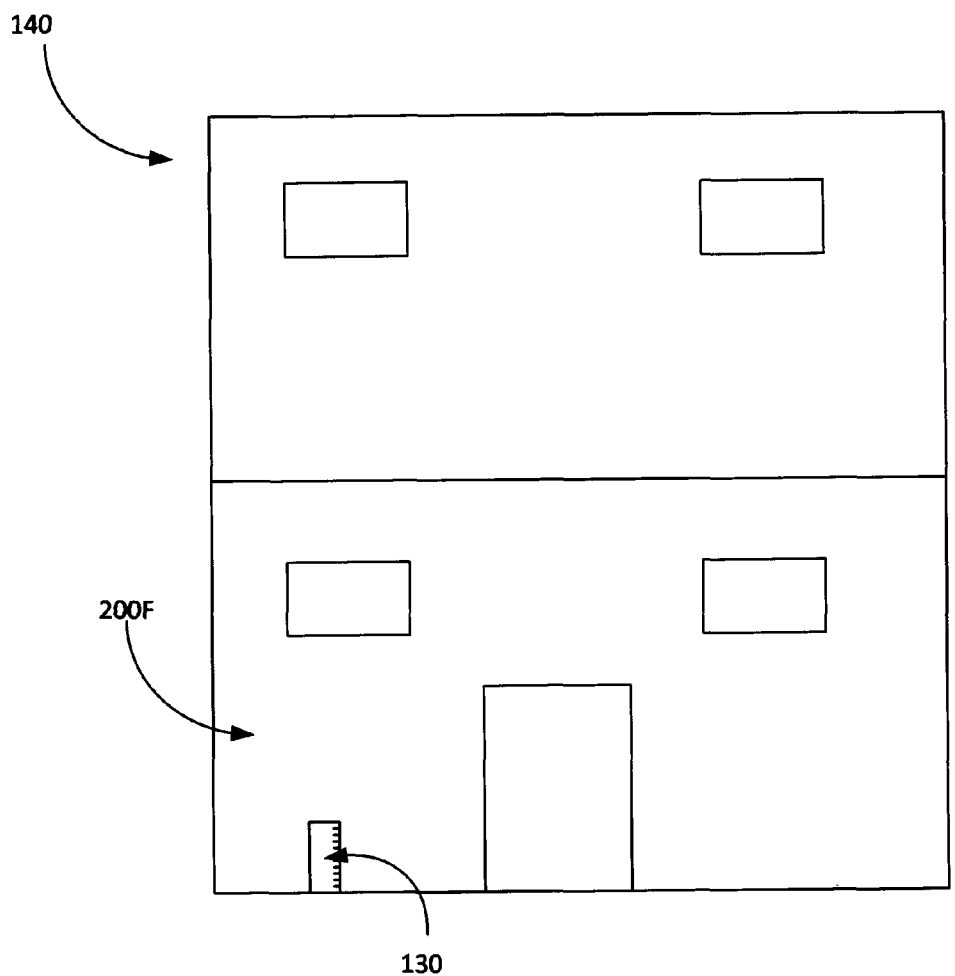
FIG. 5 shows a front view of an image of the building front side taken by the camera of FIG. 4.

At step 306, the user may use the camera 118 to capture a first digital image 140 (see FIG. 5) of the building front side 200F, with the scaling object 130 placed adjacent or directly in front of the building front side 200F. The user may cause the digital camera 118 to capture the image 140 when he (or a camera tripod stand 144, see FIG. 4) is situated directly in front of the building front side 200F. The first digital image 140 may be saved in the camera 118 (e.g., on a smart card or other memory), and/or may be transmitted by the camera 118 to the storage unit 104 (e.g., via the networking device 112 and/or the website 120).

Figure 6:
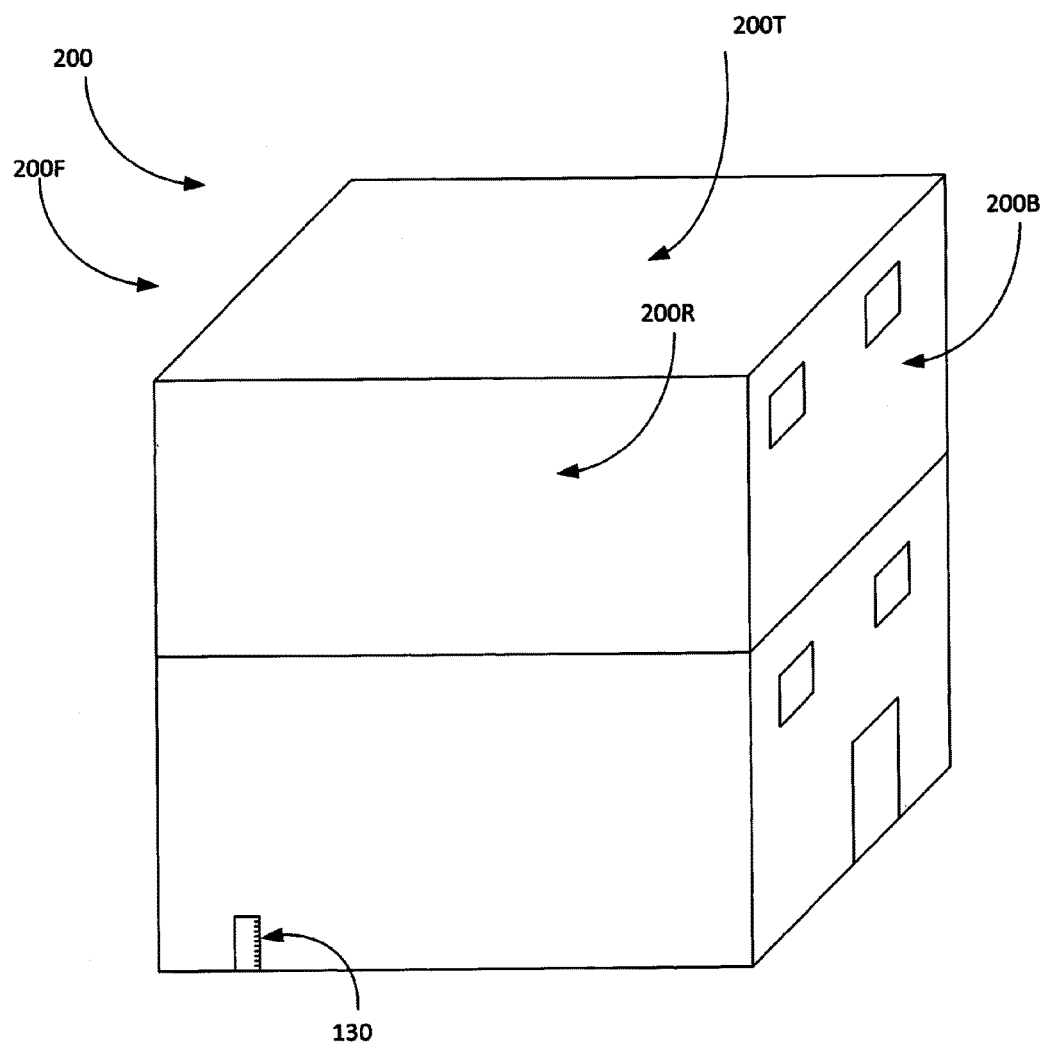
FIG. 6 shows a perspective view of the camera of FIG. 4 being used to capture an image of a right side of the building of FIG. 2.
Figure 7:
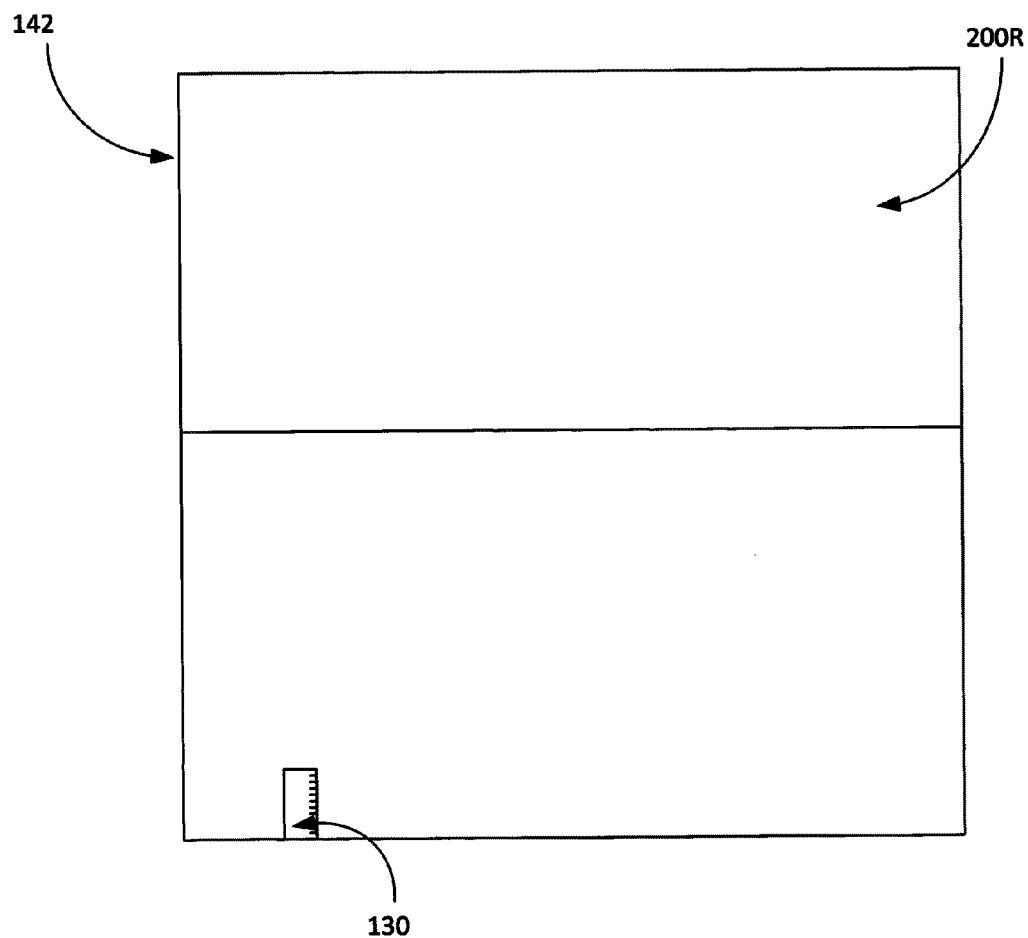
FIG. 7 shows a front view of an image of the building right side taken by the camera of FIG. 4.

At step 308, the user may place the scaling object 130 adjacent or directly in front of the building right side 200R (or the left side 200F), as shown in FIG. 6. The scaling object 130 may preferably be the same scaling object that was used above in step 304, but may also be a different scaling object. At step 310, the user may use the camera 118 to capture a second digital image 142 (see FIG. 7) of the building right side 200R (or left side 200L), with the scaling object 130 placed adjacent or directly in front of the building right side 200R. The user may cause the digital camera 118 to capture the image when he (or alternatively, the camera tripod stand 144) is situated directly in front of the building right side 200R. The second digital image 142 may be saved in the camera 118 (e.g., on a smart card or other memory), or may be transmitted by the camera 118 to the storage unit 104 (e.g., via the networking device 112 and/or the website 120).

At step 312, the user may execute the program 114. The program, at step 314, may cause the camera 118 to upload the first and second images 140, 142 onto the storage unit 104 (e.g., directly or via the website 120) if the images 140, 142 had not already been so uploaded in a previous step. In some embodiments, the program 114 may be executed before the images 140, 142 are captured, and the program 114 may direct the user to take these images 140, 142 (e.g., by outlining instructions on the output device 108). The images 140, 142 taken by the camera 118 may be in any format (e.g., png, jpeg, bitmap, giff, et cetera) and may be in any aspect ratio (e.g., 4:3, 3:2, 16:9, 5:3, 5:4, 1:1, et cetera). In the preferred embodiment, the images 140, 142 may be stored in the storage unit 104 in a 4:3 aspect ratio.

Figure 8:
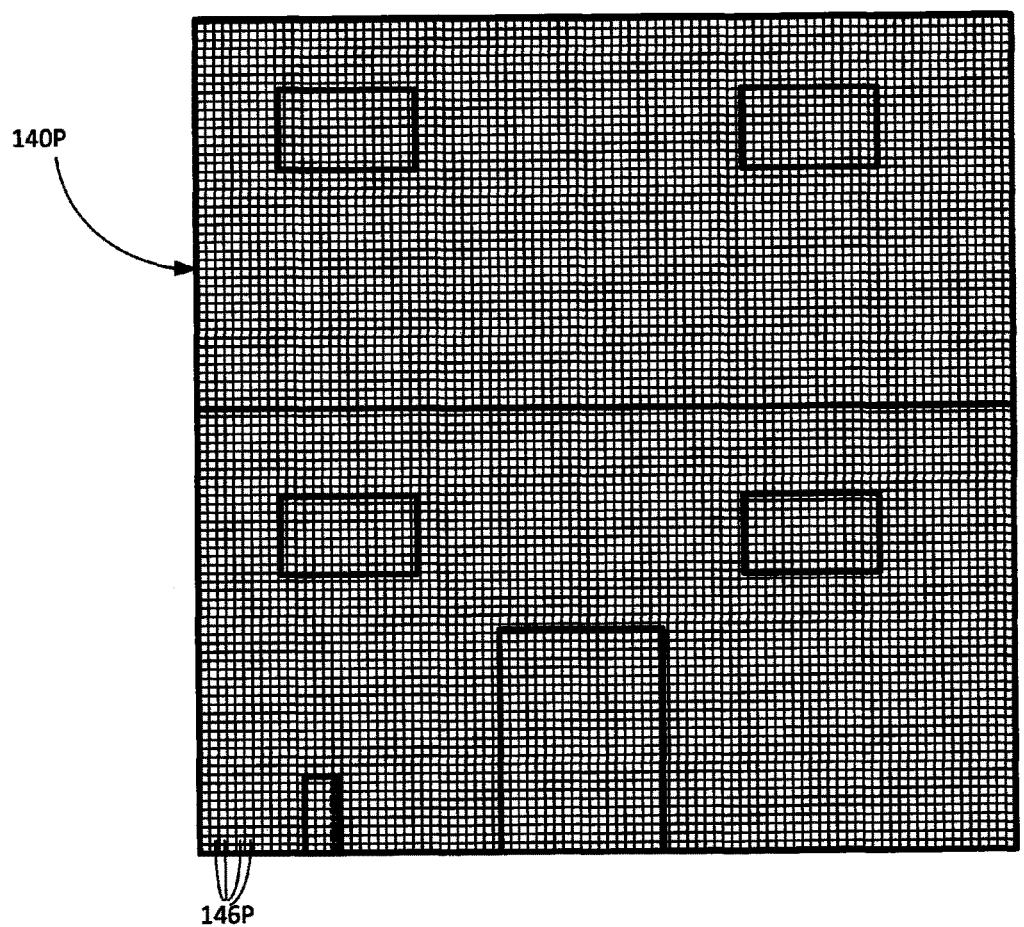
FIG. 8 shows a front view of the image of FIG. 5 divided into a grid of pixels.
Figure 9:
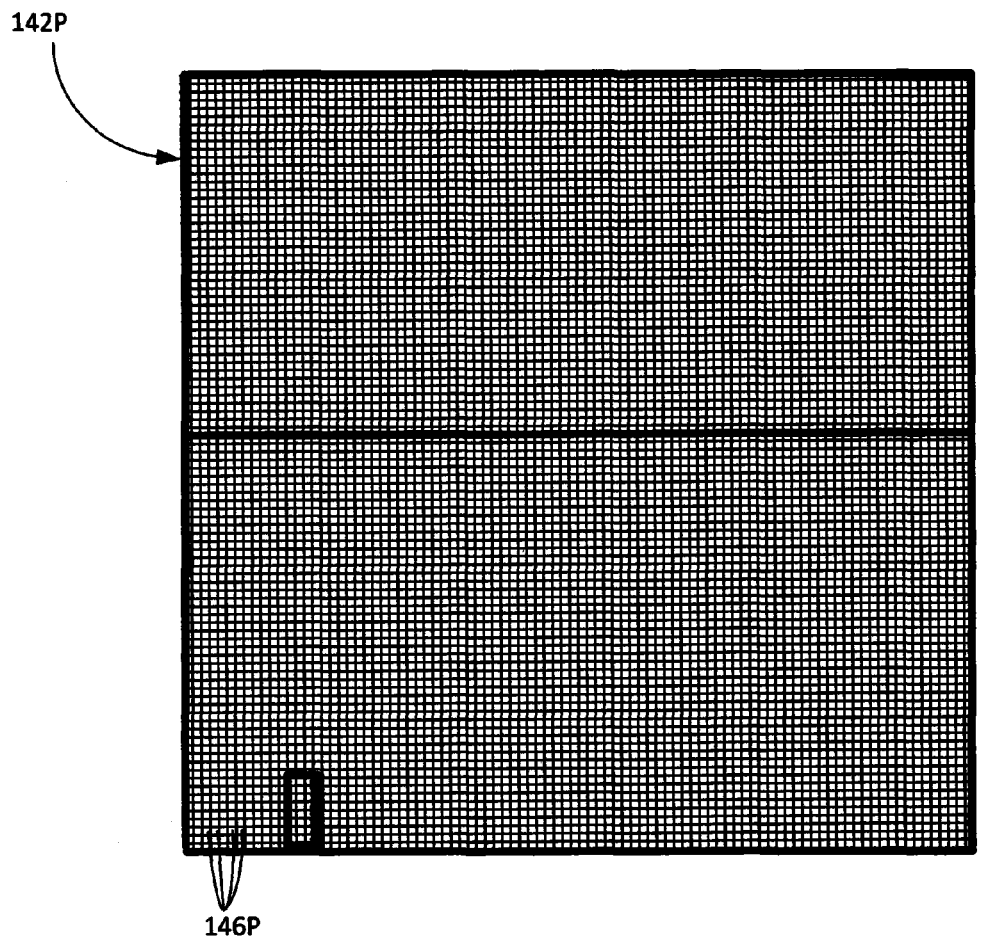
FIG. 9 shows a front view of the image of FIG. 7 divided into a grid of pixels.

Once the images are stored in the storage unit 104, the program 114 at step 316 may process the images 140, 142. Specifically, the program 114 may store the images 140, 142 in a common format (e.g., jpeg) and create a pixel grid therefrom. More specifically, as shown in FIGS. 8 and 9, the processor may create a grid 140P of pixels 146p from the digital image 140, and a grid 142P of pixels 146p from the digital image 142, respectively. While not clearly shown in the figures, each pixel grid 140p, 142p may be 576 pixels 146p wide and 432 pixels 146p high (i.e., at a resolution of 576×432). Of course, the pixel grids 140p, 142p may also be of a different resolution.

Figure 10:
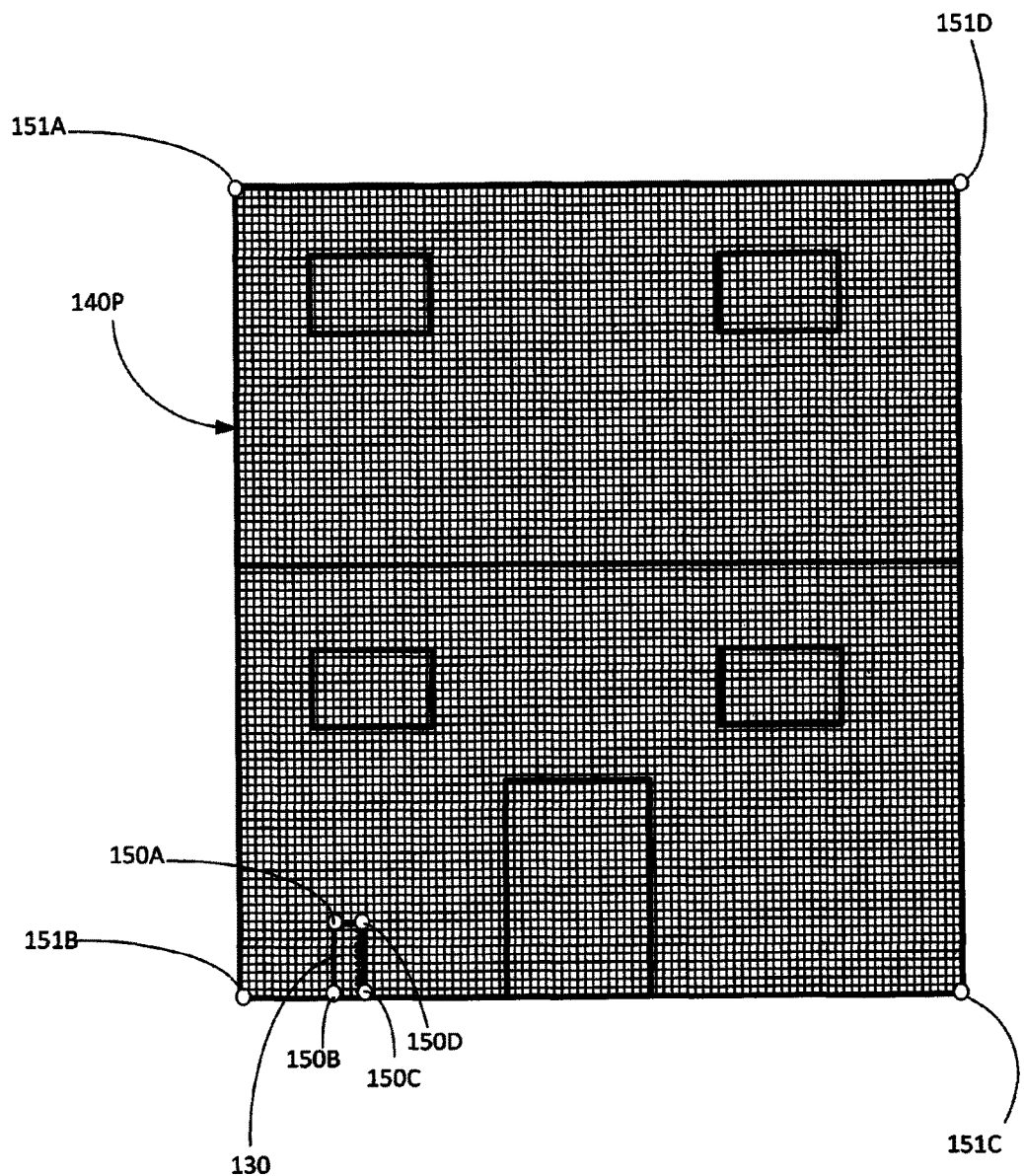
FIG. 10 shows a front view of the pixel grid of FIG. 8 after the respective endpoints of the building front side and a scaling object have been marked thereon.

At step 318, the program 114 may cause the output device 108 to display for the user the pixel grid 140p and instruct the user via the output device 108 to mark the key endpoints of the scaling object 130. At step 320, the user may use the input device 110 (e.g., a mouse, stylus pen, keyboard, et cetera) to mark the key endpoints of the scaling object 130 on the pixel grid 140p. For example, as shown in FIG. 10, the user may mark on the pixel grid 140p endpoints 150A 150B, 150C, and 150D of the scaling object 130. The program 114 may also ask the user to outline which two points denote the height 130H and the width 130W of the scaling object 130, and the user may, for example, note that the height 130H of the scaling object 130 spans from endpoint 150A to 150B and the width 130W of the scaling object 130 spans from endpoint 150A to 150D. While not shown in the figures, the system 100 may include a user interface that allows these values to be entered quickly and conveniently. At step 322, the program 114 may ask the user to enter the numerical values for the width 130W and height 130H of the scaling object 130, and the user may enter these values at step 324.

At step 326, the program 114 may ask the user to mark the key endpoints of the building front side 200F on the pixel grid 140p. At step 328, the user may mark the endpoints of the building front side 200F on the pixel grid 140p. For example, as shown in FIG. 10, the user may mark endpoints 151A, 151B, 151C, and 151D of the building front side 200F. The user may also outline that the width (or more specifically, length L (see FIG. 2)) of the building front side 200F spans from endpoint 151A to endpoint 151D, and that its height (i.e., height HT plus height HB) spans from endpoint 151A to endpoint 151B.

Figure 11:
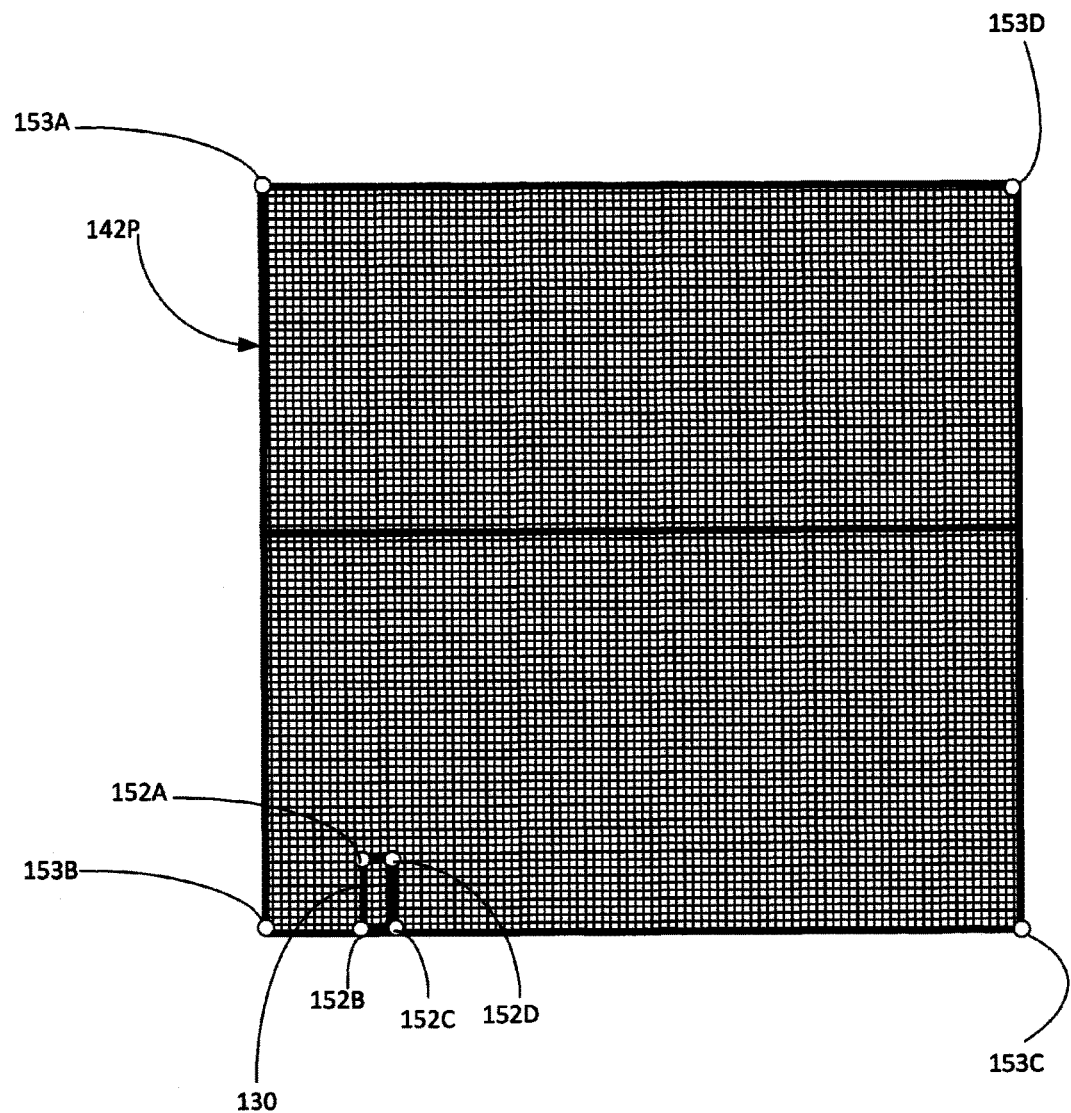
FIG. 11 shows a front view of the pixel grid of FIG. 9 after the respective endpoints of the building right side and the scaling object have been marked thereon.

At step 330, the program 114 may cause the output device 108 to display for the user the pixel grid 142p of the building right side 200R and instruct the user via the output device 108 to mark the key endpoints of the scaling object 130 thereon. At step 332, the user may use the input device 110 to mark the key endpoints of the scaling object 130 on the pixel grid 142p. For example, as shown in FIG. 11, the user may mark on the pixel grid 142p endpoints 152A 152B, 152C, and 152D and outline that the height 130H of the scaling object 130 spans from endpoint 152A to 152B and the width 130W of the scaling object 130 spans from endpoint 152A to 152D. If the scaling object 130 used in connection with the building right side 200R is different from the scaling object 130 used for the building front side 200F, the user may also enter the numerical values for the height 130H and the width 130W of the scaling object 130; otherwise, the user may specify that these dimensions of the scaling object 130 are the same as those entered at step 322.

At step 334, the program 114 may ask the user to mark the key endpoints of the building right side 200R on the pixel grid 142p. At step 336, the user may mark the endpoints of the building right side 200R on the pixel grid 142p. For example, as shown in FIG. 11, the user may mark endpoints 153A, 153B, 153C, and 153D of the building front right 200R on the pixel grid 142p. The user may also outline that the width W of the building right side 200R spans from endpoint 153A to endpoint 153D, and that its height spans from endpoint 153A to endpoint 153B.

The program 114, then, at step 338, may use the processor 102 to process the information entered and compute the length (L) and height (HT plus HB) of the building front side 200F, and the length (or width W, see FIG. 2) and the height (HT plus HB) of the building right side 200R. To illustrate, consider for example that in step 324 with respect to the building front side 200F, the user entered that the height 130H of the scaling object 130 is 100 inches. The program 114 may ascertain how many pixels 146p exist between endpoints 150A and 150B (i.e., how many pixels 146p exist along a vertical line connecting the endpoints 150A, 150B). Assume for the purposes of illustration that 20 pixels 146p exist between endpoints 150A and 150B. The program 114 may thus compute that each pixel 146p represents a height of 5 inches (i.e., 100 inches/20 pixels=5 inches/pixel). Similarly, assume that the user entered in step 324 that the width of the scaling object 130 is 20 inches. The program 114 may ascertain how many pixels 146p exist between endpoints 150B and 150C (i.e., how many pixels 146p exist along a horizontal line connecting the endpoints 150B and 150C). Consider, for example, that the 4 pixels 146p are present between endpoints 150B and 150C. The program 114 may thus compute that the width of each pixel 146p represents a width of 5 inches. After determining the height and width represented by each pixel 146p, the program 114 may use the endpoints 151A, 151B, 151C, and 151D of the building front side 200F marked by the user to compute the length (L) and height (HT plus HB) of the building front side 200F. Specifically, the program 114 may first ascertain the number of pixels 146p that lie between endpoints 151A and 151B along a vertical line connecting these endpoints. Assume, for example, that 400 pixels 146p exist between endpoints 151A and 151B. The program 114 may hence compute that the height (HT plus HB) of the building front side 200F is 2,000 inches (i.e., 400 pixels×5 inches/pixel=2,000 inches). Similarly, the program 114 may then ascertain the number of pixels 146p that exist between endpoints 151A and 151D of the building front side 200F along a horizontal line connecting these endpoints. Assume that 350 pixels exist between endpoints 151A and 151D. The program 114 may thus compute that the length (L) of the building front side 200F is 1,750 inches (i.e., 350 pixels×5 inches/pixel=1,750 inches). The program 114 may, in the same fashion, utilize the information entered by the user to ascertain the width (W) and height (HT plus HB) of the building right side 200R. Assume, for example, that the program 114 utilizes the information entered by the user regarding the building right side 200R and determines that the height (HT plus HB) of the building right side 200R is 2,000 inches, and that the width (W) of the building right side 200R is 2,500 inches.

The program 114, at step 340, may then compute the area of the building front side 200F and the building right side 200R. Specifically, the program 114 may determine that the surface area of the building front side 200F is 3,500,000 square inches (i.e., 2,000 inches×1,750 inches) and that the surface area of the building right side 200R is 5,000,000 inches squared (i.e., 2,000 inches×2,500 inches).

The program 114, at step 342, may ask the user to outline the number of windows 204 in the building 200 along with their respective endpoints, and the number of doors 206 in the building 200 along with their respective endpoints. At step 344, the user may mark the endpoints of the windows 204 and the door 206 and specify that the building front side 200F has four windows 204 and one door 206. The program 114, as illustrated above with respect to the building front side 200F, may compute at step 346 the surface area of the windows 204 and the door(s) 206. Assume, for example, that the program 114 determines that the surface area of each window 204 is 2,000 square inches, and that the surface area of the door 206 is 10,000 square inches. The program 114 may at step 348 subtract the area of the windows 204 (i.e., 2,000 square inches×4 windows=8,000 square inches) and the door 206 (i.e., 10,000 square inches×1 door=10,000 square inches) from the area of the building front side 200F and determine that the area of the building front side 200F that will need to be painted is about 3,482,000 square inches (i.e., 3,500,000 square inches−8,000 square inches (to account for windows 204)−10,000 square inches (to account for door 206)=3,482,000 square inches or 24,180.555 square feet). The user may also enter at step 342 that the building right side 200R does not include any windows or doors and that the entire building right side 200R would need to be painted.

At step 350, the program 114 may ask the user to input the square feet of coverage each gallon of paint used by the user provides. As people of skill in the art appreciate, a first manufacturer of paint may specify that their paint properly covers 200 square feet per gallon while a second manufacturer of paint may specify that their paint appropriately covers 300 square feet per gallon. Assume for the purposes of this example that the paint being used by the user covers 300 square feet per gallon. At step 352, the program may calculate the volume of paint that would be required to paint the building 200, and list these and other calculated valued on the output device 108. For example, the program 114 may list on the output device 108 that the total area of the building front side 200F is 3,500,000 square inches (or 24305.55 square feet), that 3,482,000 square inches (or 24,180.555 square feet) needs to be painted, and that this area would require about 80.6 gallons of paint (i.e., 24,180.55 square feet/300 square feet per gallon=80.6 gallons). The program 114 may similarly list that the area of the building right side 200R is 5,000,000 square inches (or 34,722.22 square feet), that all this area needs to be painted, and that this area would require about 115 gallons of paint (i.e., 34,722.22 square feet/300 square feet per gallon=115.7 gallons). The program 114 may list all these values at step 354 on the output device 108. Specifically, the program 114 may list the height (HT plus HB) and length (L) of the building front side 200F, the height (HT plus HB) and width (W) of the building right side 200R, the area that would need to be painted on each of the building front side 200F and the building right side 200R, and the volume of paint that would be needed to effectuate this painting. The program 114 may also take into account the dimensions of the building back side 200B and building left side 200L in making these calculations. For example, where the building back side 200B and building left side 200L are identical to the building front side 200F and the building right side 200R, respectively, the program 114 may outline that the total paint required to paint the building 200 would be 392.6 gallons (i.e., (115.7 gallons+80.6 gallons)×2=392.6 gallons). Had all sides of the building 200 been dissimilar, for example, the system 100 may have allowed for separate images of each side to be taken and independently processed. The program 114 may then end at step 354.

Thus, as has been described, the system 100 may allow a user to conveniently determine the dimensions of a building 200 and, for example, the volume of paint that would be required to paint the same, by utilizing digital photography. The system 100 may also allow the user to separately demarcate the top floor 200T and the bottom floor 200B and compute for the user the volume of paint that would be required to paint each floor. People of skill in the art will appreciate that while a building 200 was used to illustrate the method 300, that dimensions of other objects (e.g., pallets of freight, cartons, et cetera) may similarly be determined by the system 100. Further, the program 114 may also utilize known geometric methods (e.g., the Pythagorean distance formula) to divide non-symmetrical and/or non-linear (e.g., concave or convex) structures into triangles and quadrilaterals and determine these structures' dimensions.

Figure 12:
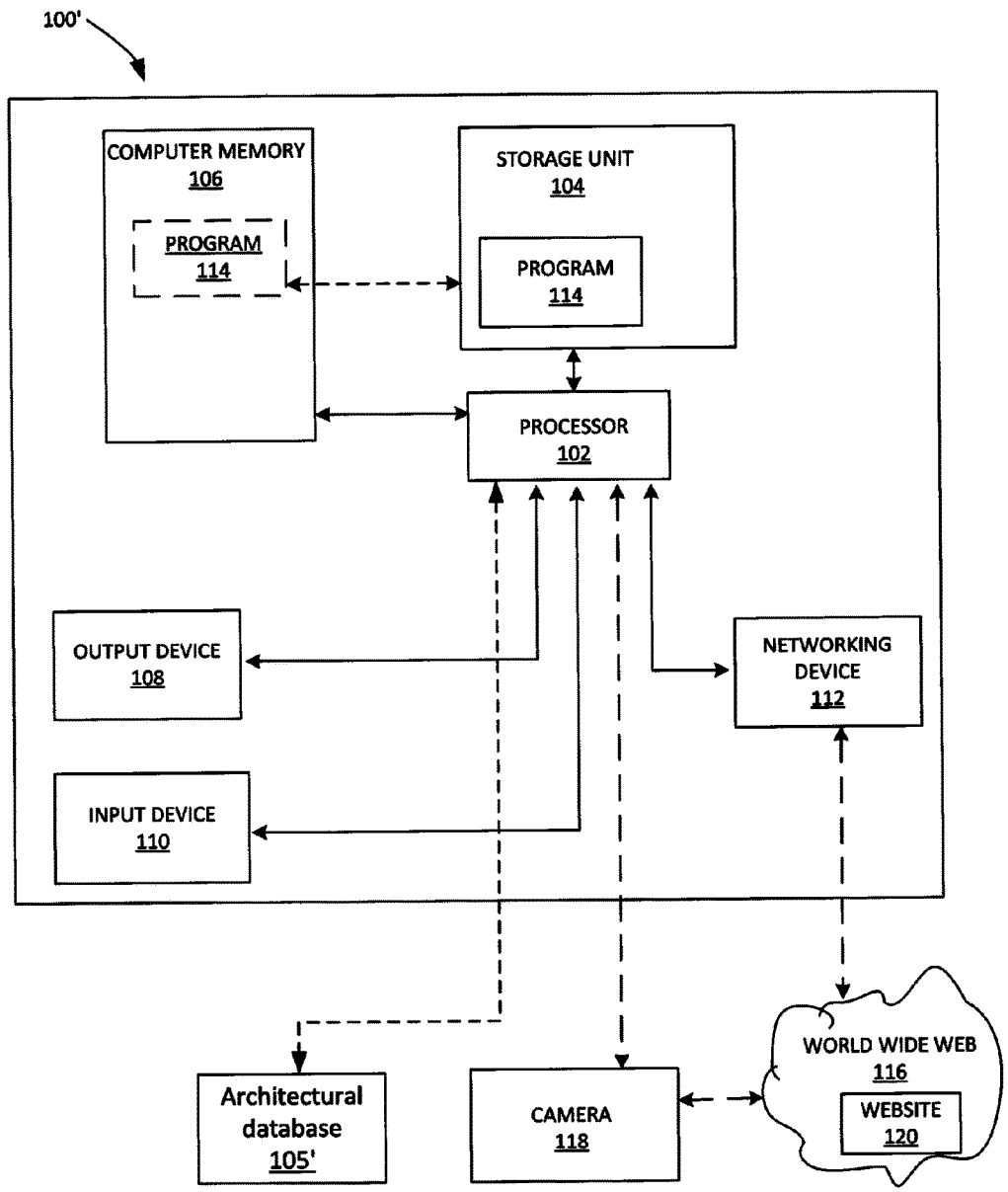
FIG. 12 shows a schematic representation of an alternate embodiment of the system of FIG. 1.

Attention is now directed to FIG. 12, which shows an alternate embodiment 100' of the system 100 that is substantially similar to the embodiment 100, except as specifically noted and/or shown, or as would be inherent. Further, those skilled in the art will appreciate that the embodiment 100 (and thus the embodiment 100') may be modified in various ways, such as through incorporating all or part of the disclosure provided herein. For uniformity and brevity, corresponding reference numbers may be used to indicate corresponding parts, though with any noted deviations.

One of the key differences between system 100 and system 100' is that the system 100' may include an architectural database 105' in data communication with the processor 102. The architectural database 105' may include pictures and dimensions of various types of doors, windows, cabinets, et cetera, and the system 100' may allow the user to choose those elements that are included in the structure the user desires to analyze. For example, as shown in FIG. 13, the system 100' may allow the user to choose one of garage doors 403, screen doors 405, sliding doors 407, entrance doors 409, and other doors 411 (which may include, for example, French doors, swinging patio doors, et cetera). If, for example, the user selects entrance doors 409 as in FIG. 13, the program 114 may display on the output device 108 images, dimensions and other information about different types of entrance doors 409A, 409B, 409C, 409D, et cetera. Assume, for example, that the building being analyzed by the user includes the door 409A. The system 100' then in its calculations may automatically use the dimensions of the door 409A for scaling the structure's dimensions, thus rendering superfluous the use of the separate scaling object 130. Of course, if the building being analyzed by the user includes a door (or window, cabinet, et cetera) not present in the database 105', the user may manually mark its and the scaling object's endpoints as outlined above with respect to the method 300. The database 105' may take into account the locale in which the system 100' is being utilized and initially display only those entrance doors 409 that are primarily used in that locale, so that the user is not forced to needlessly scroll through hundreds of options. While not clearly shown in the figures, the database 105' may also include the price of each item (e.g., of doors 409) and suitable alternatives for that item (e.g., door 409C may be listed as a suitable alternative for door 409B).

Figure 14:
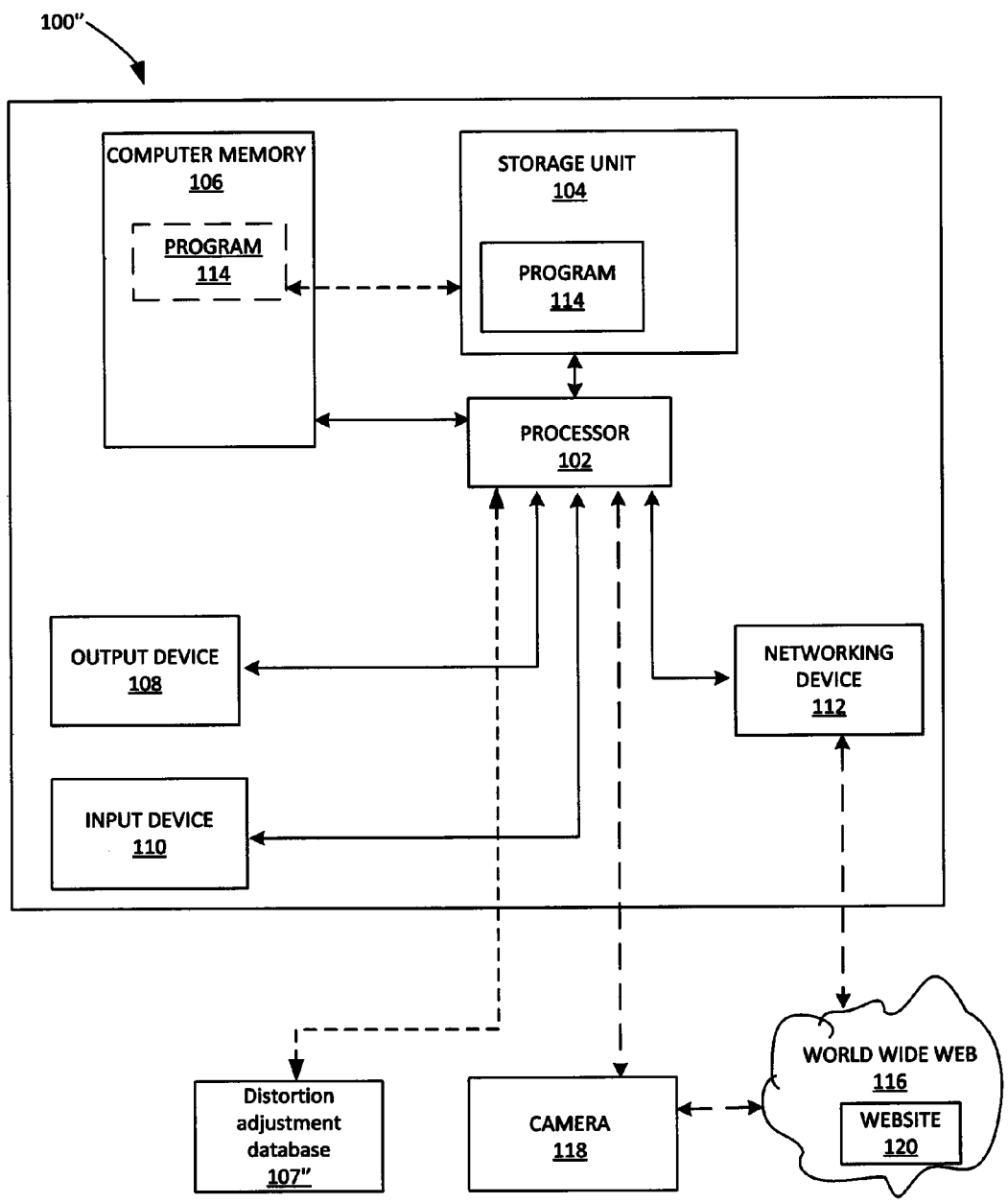
FIG. 14 shows a schematic representation of yet another alternate embodiment of the system of FIG. 1.

Attention is now directed to FIG. 14, which shows an alternate embodiment 100'' of the system 100 that is substantially similar to the embodiment 100, except as specifically noted and/or shown, or as would be inherent. Further, those skilled in the art will appreciate that the embodiment 100 (and thus the embodiment 100''') may be modified in various ways, such as through incorporating all or part of the disclosure provided herein. For uniformity and brevity, corresponding reference numbers may be used to indicate corresponding parts, though with any noted deviations.

One of the key differences between system 100 and system 100" is that the system 100" may include a distortion adjustment database 107" in data communication with the processor 102. When two dimensional images (e.g., images 140, 142) of three dimensional objects (e.g., the building 200, pallets of freight, et cetera) are captured, it may often be difficult to accurately distinguish on the pixel grids (e.g., pixel grids 140p, 142p) created from those images the endpoints of the object from the surface on which the object rests. For example, if a three dimensional pallet of freight is resting on a surface, it may be difficult to correctly differentiate on the two dimensional pixel grid created from an image of the pallet the end points of the pallet from the surface on which it rests. This problem may be more pronounced in the vertical plane than in the horizontal plane, because unlike the bottom edges of a structure which generally rest upon and are adjacent another surface (e.g., the ground), the side edges of a structure are generally not abutting against or adjacent another structure. In the vertical plane, however, it has been found that the dimensions (e.g., the height) of a structure computed by the program 114 may need to be adjusted depending on the distance from which the image of the structure is taken and the difference between the height of the scaling object 130 and the height of the object as calculated by the system 100".

Figure 15:
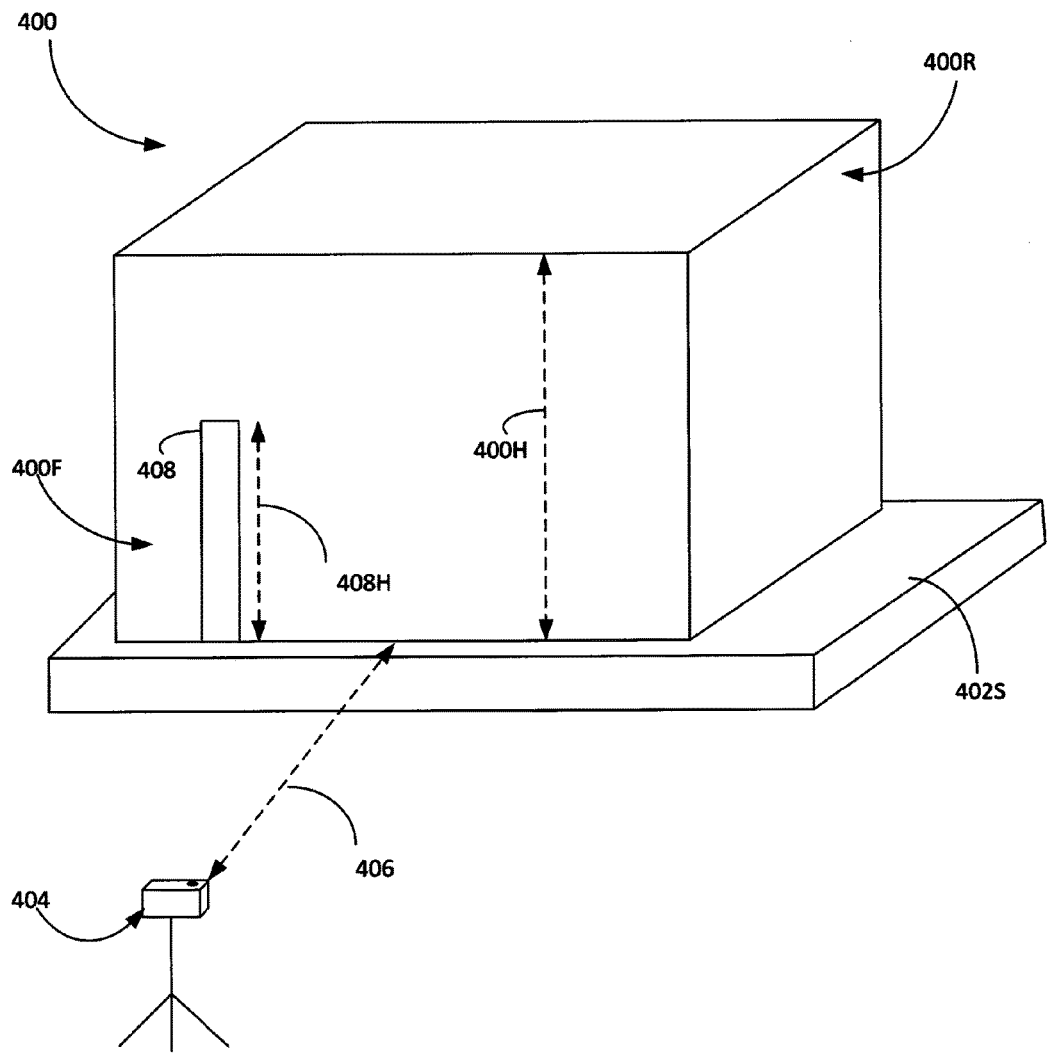
FIG. 15 shows a perspective view of a camera being used to capture an image of a pallet of freight.
Figure 16:
FIG. 16 shows exemplary contents of a distortion adjustment database of the system of FIG. 14.

Assume, for example, that a height 400H of a front side 400F of a pallet of freight 400 (FIG. 15) needs to be determined using the system 100". As can be seen, the pallet 400 is resting on a stand 402S, and a camera 404 is located at a distance 406 from the pallet front side 400S. Assume also that a scaling object 408 being used in connection with this determination has a height 408H. Attention is now directed to FIG. 16, which shows a spread sheet 500 outlining some of the vertical adjustments 410 that will be used by the system 100" to determine the height 400H of the pallet 400. To facilitate discussion, it may be helpful to identify certain discrete cells of the spreadsheets shown in FIG. 16; these cells will be referred to herein by their column and row numbers. For example, row 1 outlines that when the distance 406 between the camera 404 and the pallet front side 400F is 72 inches (cell A1), the height 408H of the scaling device 408 is 72 inches (cell B1), and the height 400H of the pallet front side 400F as initially computed by the system 100" (in the same manner as in method 300 outlined above) is 72 inches (cell C1), that the vertical adjustment 410 will be zero inches (cell D1). However, when the distance 406 between the camera 404 and the pallet front side is 72 inches (cell A2), the height 408H of the scaling device is 72 inches (cell B2), and the height 400H of the pallet front side 400F as initially computed by the system 100" is 62 inches (cell C2) as in row 2, that the computed height of 62 inches will need to be adjusted by 0.2 inches (cell D2). That is, the actual height 400H of the pallet front side 400F will be 62.2 inches, even though the system 100" initially computed this height to be 62 inches.

As can be appreciated by the spreadsheet of FIG. 16, the vertical adjustments 410 are dependent on various factors. For example, as shown in rows 1, 4, 7, 10, and 13, when the height 408H of the scaling device 408 is the same as the height 400H of the pallet front side 400F as initially computed by the system 100", that the vertical adjustments 410 will be zero inches irrespective of the distance 406 between the camera 404 and the pallet front side 400F. However, as illustrated by rows 2 and 3, rows 5 and 6, rows 8 and 9, rows 11 and 12, and rows 14 and 15, for a constant distance 406 between the camera 404 and the pallet front side 400F, the vertical adjustment factor 410 generally increases as the difference between the height 408H of the scaling device 408 and the initially computed height 400H of the pallet front side 400S increases. Similarly, as illustrated by rows 2, 5, and 14, when the height of the scaling device 408 and the initially computed height 400H of the pallet front side 400F are constant, the vertical adjustment factor 410 generally increases as the distance 406 between the camera 404 and the pallet front side 400F increases. The system 100" may automatically include the vertical adjustments 410 in its computations depending on the distance 406 between the camera 404 and the pallet front side 400F, the height of the scaling device 408, and the height 400H of the pallet front side 400F as initially computed by the system 100".

The values for vertical adjustment 410 represented by row 2, for example, were determined as follows using an object (e.g., the freight pallet 400) whose actual height (e.g., height 400H) was 62.2 inches. First, the system 100" was used to compute the height of the object using a scaling device (e.g., scaling device 408) having a height (e.g., height 408H) of 62 inches. This process was repeated numerous times, and the standard deviation of these values was computed using known statistical methods. It was found that about 68% of the computed values were within 0.4 inches of the actual height of 62.2 inches. Then, the value for the vertical adjustment 410 that accurately compensated the highest number of computed heights (i.e., the median of the needed vertical adjustments) was taken and rounded to one decimal point. As outlined in cell D2, in this scenario, the vertical adjustment was determined to be 0.2 inches. The remaining values in the spreadsheet 500 were similarly determined. People of skill in the art will appreciate that while the spreadsheet 500 outlines the vertical adjustment factors 408 for certain unique situations, that the distortion adjustment database 107" may include hundreds of thousands of such vertical adjustment factors 408 which the system 100" could take into account depending on the distance 406 between the camera 404 and the object, the height of the scaling device 408, and the initially computed height of the object.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method for estimating the area of structure, the structure having a first floor, a second floor, a first side including a first wall and a second side including a second wall, the first wall having first gap on the first floor and a second gap on the second floor, the first gap configured for the placement of a first object and the second gap configured for the placement of a second object, the method comprising steps:

a) providing:
- a processor in data communication with each of a first non-transitory computer memory having computer implemented instructions stored thereon, an input device, and an output device;
- a portable digital camera configured to communicate with the processor over a network; and
- a solitary scaling device;

b) placing the scaling device adjacent the first wall such that the scaling device is proximate the first gap relative to the second gap;

c) using the digital camera to capture a first image of the scaling device and the first wall in response to a directive generated on the output device by the computer implemented instructions;

d) placing the scaling device adjacent the second wall;

e) using the digital camera to capture a second image of the scaling device and the second wall;

f) causing the digital camera to transmit the first and the second images to the first non-transitory computer memory; and g) using the computer implemented instructions stored in the first non-transitory computer memory to:
- convert the first image into a first pixel grid and the second image into a second pixel grid;
- display on the output device the first pixel grid and the second pixel grid;
- allow for use of the input device for the marking on the first pixel grid of at least two end points of each of the first wall, the first gap, the second gap, and the scaling device;
- receive as an input via the input device at least a height and a width of the scaling device to compute a height and a width of each pixel of the first pixel grid; the height and width of the scaling device being respectively less than a height and a width of the first gap;
- compute, using the endpoints and the first pixel grid, a first gap area, a second gap area, and a first side area;
- calculate an area of the first wall by subtracting from the first side area each of the first gap area and the second gap area; and
- display on the output device the calculated area of the first wall.

2. The method of claim 1 further comprising steps:
receiving via the input device a coverage area per gallon of a first paint and a second paint; and
computing, using the computer implemented instructions, a volume of the paint required to paint the structure using the first paint and the second paint.

3. The method of claim 1, wherein the first and the second images stored in the first non-transitory computer memory have an aspect ratio of 4:3.

4. The method of claim 1 wherein:
the first gap is non-symmetrical; and
the computer implemented instructions compute the first gap area by dividing the first gap into a plurality of substructures; at least one of said substructures being in the shape of a triangle; at least another of said substructures being in the shape of a quadrilateral.

5. The method of claim 4 wherein:
the computer implemented instructions further calculate and display on the output device each of a first floor area and a second floor area.

6. The method of claim 5 wherein the computer implemented instructions display on the output device a volume of paint required to paint the first floor.

7. The method of claim 1 wherein the digital camera wirelessly transmits the first image and the second image to a secure website.

8. The method of claim 1 wherein the first object is a window and the second object is a door.

* * * * *